No. 780,117. PATENTED JAN. 17, 1905.
J. O. MORRIS.
REGISTER.
APPLICATION FILED DEC. 9, 1903.

Witnesses
E. F. Stewart
Jno. E. Parker

John O. Morris, Inventor.
by C. A. Snow & Co.
Attorneys

No. 780,117. PATENTED JAN. 17, 1905.
J. O. MORRIS.
REGISTER.
APPLICATION FILED DEC. 9, 1903.

John O. Morris,
Inventor.

Witnesses
by C. A. Snow & Co.
Attorneys

No. 780,117. PATENTED JAN. 17, 1905.
J. O. MORRIS.
REGISTER.
APPLICATION FILED DEC. 9, 1903.

Witnesses
E. K. Stewart
Jno. E. Parker

John O. Morris, Inventor.
by C. A. Snow & Co.
Attorneys

No. 780,117. PATENTED JAN. 17, 1905.
J. O. MORRIS.
REGISTER.
APPLICATION FILED DEC. 9, 1903.

Witnesses
E. H. Stewart
Jno E Parker

John O. Morris, Inventor.
by C A Snow & Co
Attorneys

No. 780,117. PATENTED JAN. 17, 1905.
J. O. MORRIS.
REGISTER.
APPLICATION FILED DEC. 9, 1903.

Witnesses

John O. Morris Inventor
by C. A. Snow & Co
Attorneys

No. 780,117.                                              Patented January 17, 1905.

UNITED STATES PATENT OFFICE.

JOHN ODEN MORRIS, OF RICHMOND, VIRGINIA, ASSIGNOR, BY DIRECT AND MESNE ASSIGNMENTS, TO EVERY FARE REGISTER COMPANY, INCORPORATED, OF RICHMOND, VIRGINIA, A CORPORATION OF VIRGINIA.

REGISTER.

SPECIFICATION forming part of Letters Patent No. 780,117, dated January 17, 1905.

Application filed December 9, 1903. Serial No. 184,466.

*To all whom it may concern:*

Be it known that I, JOHN ODEN MORRIS, a citizen of the United States, residing at Richmond, in the county of Henrico and State of Virginia, have invented a new and useful Register, of which the following is a specification.

This invention relates to certain improvements in fare-registers, and has for its object, among others, to so arrange and construct a registering device as to insure the registration of each fare collected by the conductor, this object being attained by providing the register with means for operating an alarm at either regular or irregular intervals, the alarm being actuated after a number of fares have been registered and notifying the person paying the fare at the time of sounding the alarm that he is entitled to a prize or award in the nature of one or more car-tickets, a free ride, cash, or offering such other inducement as will tend to keep the attention of the passengers constantly attracted to the register, and thus render it difficult for the conductor to register less fares than he collects.

A further object of the invention is to provide a novel means for controlling the electrical circuit in which the alarm mechanism is contained, to the end that the alarm may be energized at either regular or irregular intervals, and to provide means whereby adjustment may be effected at the car barn or station, so that conductors taking out cars will not be informed by previous experiences with the same car of the periods at which the alarm mechanism will be operated.

A still further object of the invention is to provide a novel means for registering the number of times the alarm mechanism is operated, so that the auditor at the car-barn may readily check the conductor's account.

A further object of the invention is to provide a novel form of registering mechanism of that general class in which a single operating-lever when moved in one direction will register one class of fares, such as cash fares, and when moved in the opposite direction will register a second class of fares, such as tickets or transfers.

A still further object of the invention is to provide novel registering means whereby an accurate account may be kept of the number of fares of each class received, and, further, to provide means whereby the total number of all classes of fares may be registered and displayed through suitable display-openings in the front of the casing.

With these and other objects in view, as will hereinafter appear more fully, the invention consists of the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings.

Similar numerals of reference are employed to indicate corresponding parts throughout the several figures of the drawings.

The mechanism is provided with a suitable casing 1, having a front plate 2, which may bear the name of the device and the name of the company, together with suitable descriptions indicating the class of fares and totals to be registered. Through the front of the casing extend display-openings 3 and 4, the former for displaying the cash-fare-registering devices and the latter for the display of the tickets-registering devices. Above these openings are totals-registering openings 5, through which may be displayed the numerals on the totals-registering disks. Above the openings 5 is a small opening 6, through which may be displayed numerals indicating or registering the number of times the alarm mechanism is operated. The front plate is further provided with an opening 7 of some distinguishing or attractive shape, that in the present instance being in the form of a star, and these may be covered with translucent glass of any color, to be illuminated by a pea-lamp, which is energized by the closing of the alarm-circuit and instantly attracts the attention of the passengers, and in this connection it is preferred to employ a suitable audible alarm in the form of an electromagnetic bell connected in series or multiple with the lamp and a source of electrical energy.

Within the casing is a base-plate 10, supported by brackets 11, that project from the opposite side walls of the casing. To the base-plate is secured a pair of pendent plates 12, and these in connection with plates 13 serve to support the lower portions of the registering mechanism. The frame is provided with a pivot-stud 16, on which is fulcrumed an operating-lever 17, the lower end of which extends through a slot or opening in the bottom of the casing and is connected to pull rods or cords 18 19, that lead, respectively, to opposite sides of the car, the pulling of the cord or rod 18 serving to register a cash fare and pulling in the opposite direction by means of the rod or cord 19 serving to register the receipt of a ticket. This lever is maintained in a central position by means of a pair of spring-pressed rods 20, adapted to suitable guiding-openings in boxes or blocks 21, that are carried by the plate 12, each bar carrying an antifriction-roller 22 for engagement with the lever, and the springs are of equal tension, so that the operating-lever will normally remain in a substantially vertical plane. At the upper end of the lever is a laterally-extended arm 23, carrying a pivoted pawl 24 for engagement with the teeth of a ratchet-wheel 25, that is mounted on a stud 26, and rotating therewith is a stop-wheel 27, having peripheral notches 28, equal in number to the number of ratchet-teeth, and engaging the periphery of said stop-wheel is an antifriction-roller 29, carried by a spring-pressed bar 30. This construction is such that on movement of the lever by pulling on the rod or cord 18 the ratchet-wheel will be turned to the extent of one tooth, and when so turned the antifriction-roller will be raised out of engagement with one of the notches of the stop-wheel 27 and at the completion of the movement of the lever will drop into engagement with the next succeeding notch and stop the wheel in proper position, so that when the lever is returned to initial position by one of the spring-pressed bars 20 the pawl carried thereby will engage directly behind the next succeeding tooth of the ratchet-wheel. On movement in the opposite direction the ratchet-wheel will be held from rotative movement by the engagement of the antifriction-roller 29 with one of the notches 28 while the pawl carried by the operating-lever moves to engage the next succeeding tooth of the ratchet-wheel, and on release of the pull rod or cord 19 the opposite spring-pressed bar 20 will restore the lever to its central position, the stretch of the spring being sufficient to effect the turning of the ratchet-wheel through pawl 24 to the extent of a single tooth and the antifriction-roller 29 then dropping into engagement with the next succeeding notch 28. This mechanism therefore forms an accurate means for regulating the movement of the lever and the movement of the registering mechanism which it operates.

Figure 1:
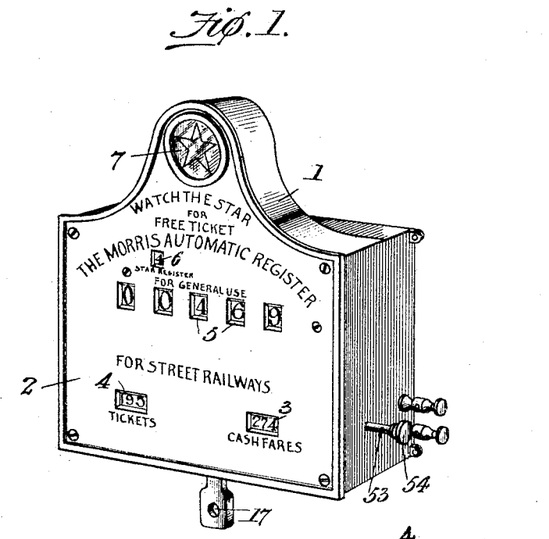
Figure 1 is a perspective view of a fare-register constructed in accordance with the invention.
Figure 2:
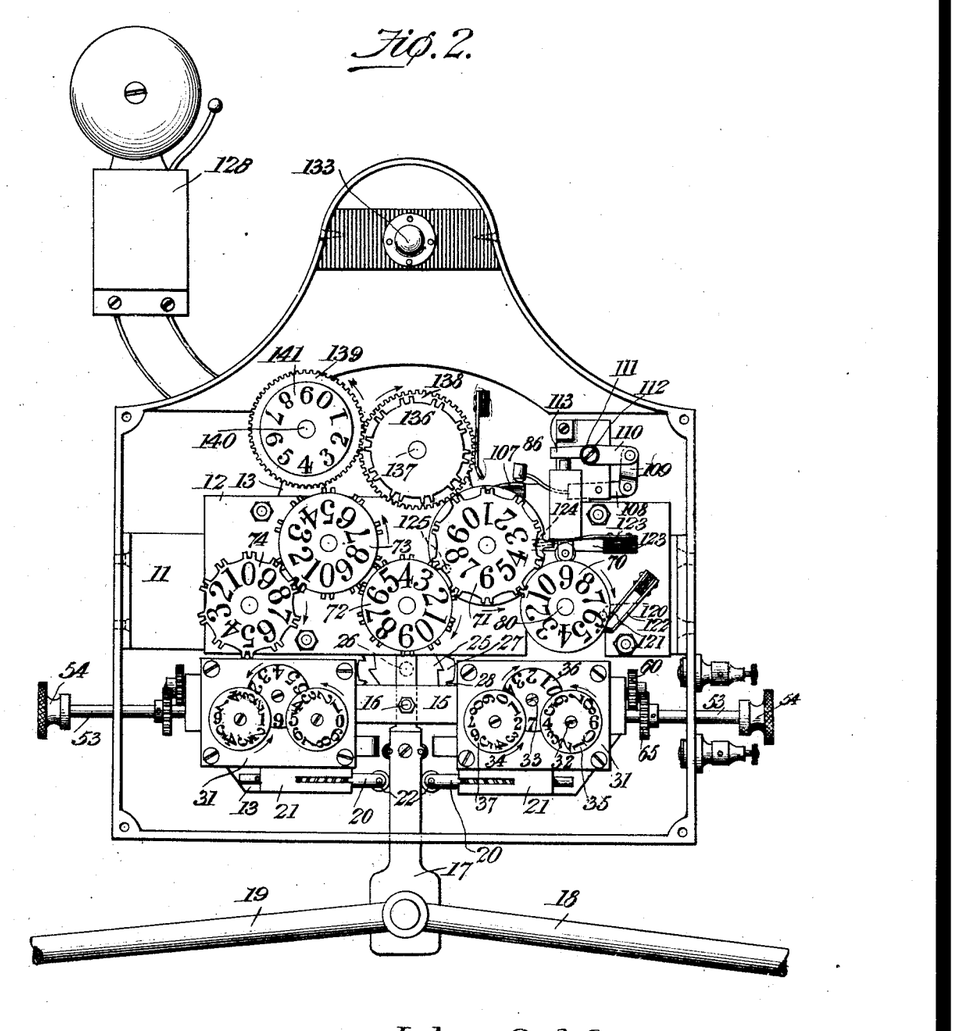
Fig. 2 is a front elevation of the same, the front of the casing being removed.
Figure 3:
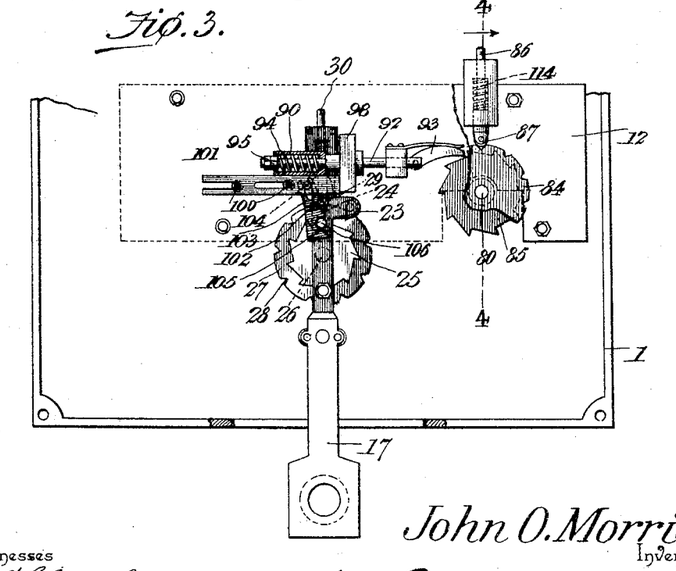
Fig. 3 is an elevation of the mechanism looking from the rear.
Figures 4, 5, 6, 7:
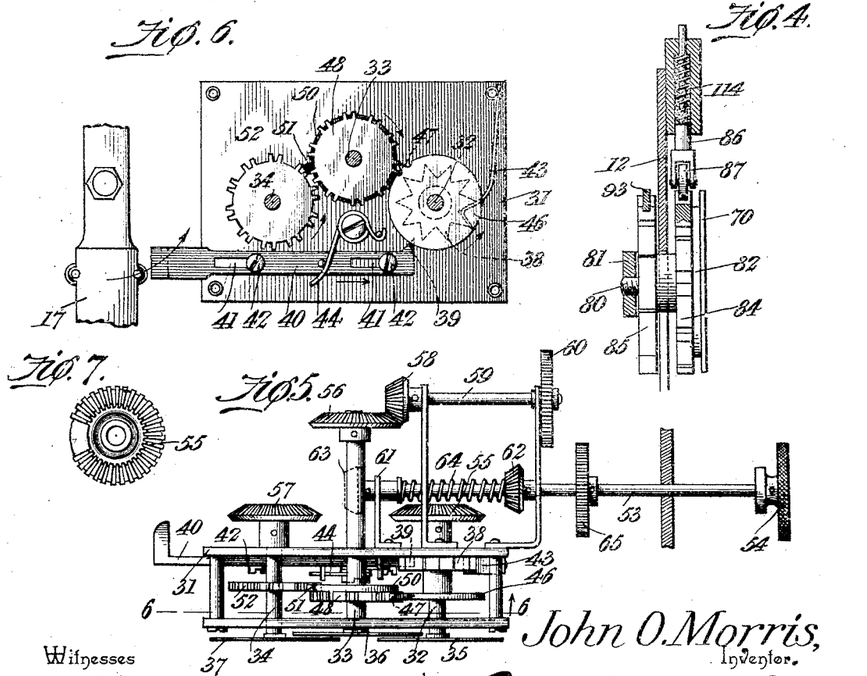
Fig. 4 is a transverse sectional view of a portion of the device on the line 4 4 of Fig. 3, the view being on a somewhat larger scale.
Fig. 5 is a plan view of the mechanism for registering cash fares and illustrating also the construction of the restoring devices.
Fig. 6 is an elevation of the same, partly in section, on the line 6 6 of Fig. 5.
Fig. 7 is a detail view of one of the gears of the restoring mechanism.
Figure 8:
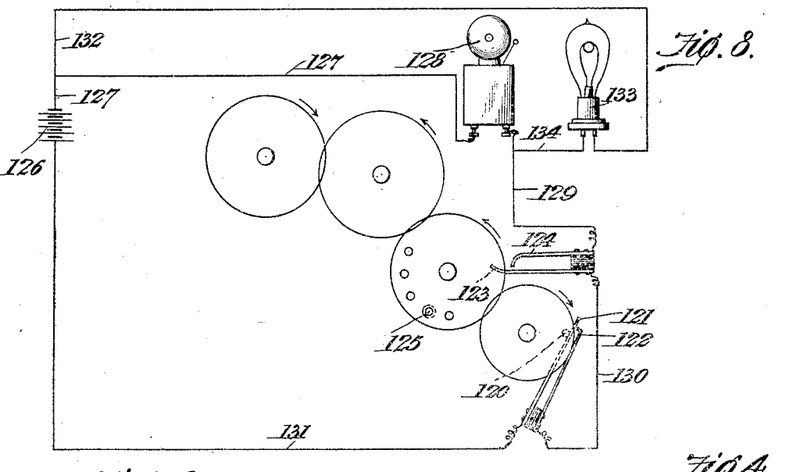
Fig. 8 is a diagram of the wiring system.
Figures 9, 10, 11:
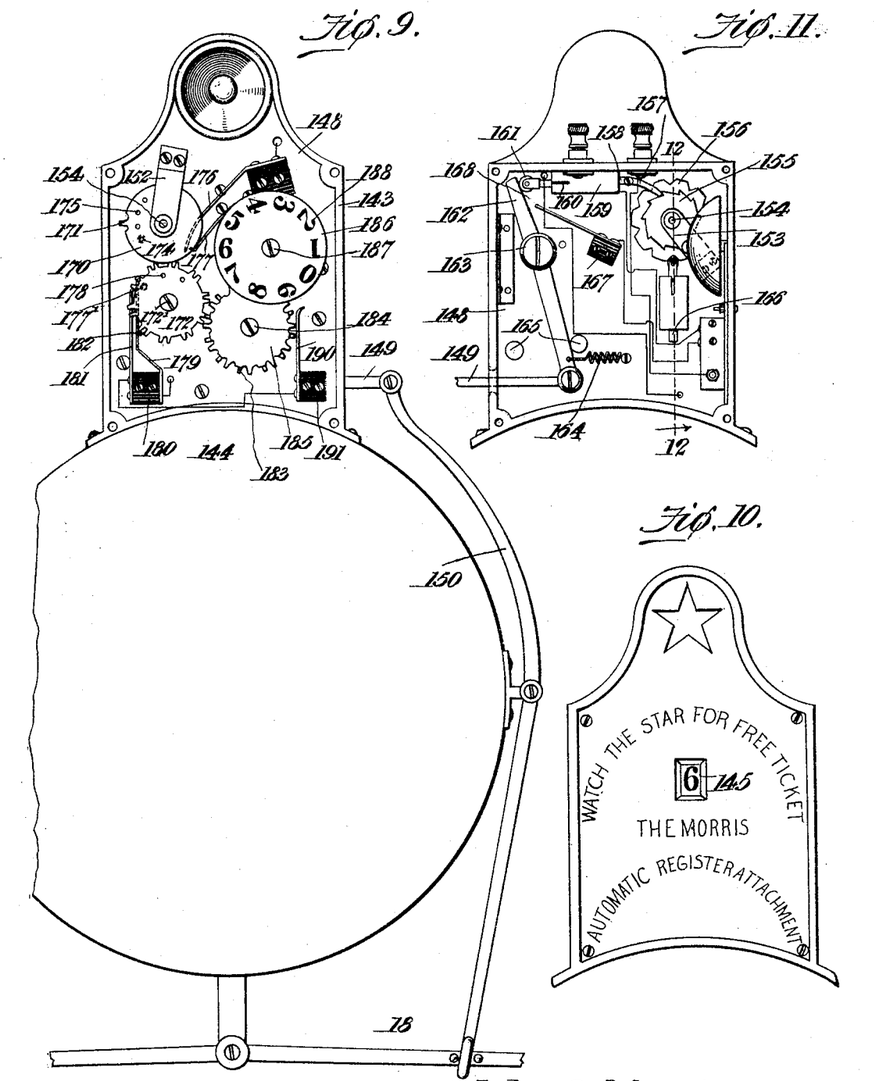
Fig. 9 is a front elevation illustrating the application of the invention to an ordinary form of fare-register, the front of the casing of the prize-awarding device being removed.
Fig. 10 is a detail view of the front plate of the apparatus shown in Fig. 9.
Fig. 11 is a view of the attachment looking from the rear.
Figure 12:
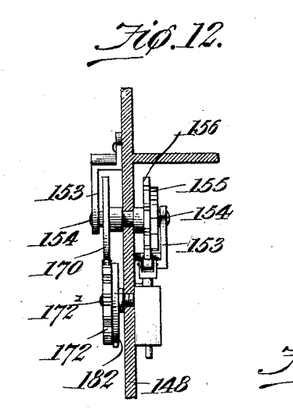
Fig. 12 is a sectional elevation of the same on the line 12 12 of Fig. 11.
Figure 13:
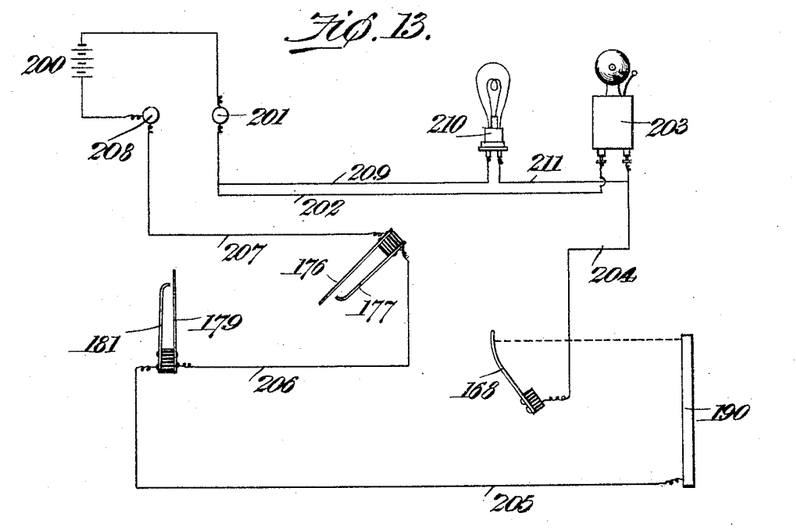
Fig. 13 is a diagram of the wiring of the register attachment.

Referring now more particularly to the mechanism for registering cash fares, 31 represents a suitable frame arranged in front of the plate 12 and provided with suitable bearings for the reception of three horizontally-disposed shafts 32, 33, and 34, to which are secured, respectively, indicating or registering disks 35, 36, and 37, all bearing numerals from "0" to "9" and movable to positions in alinement with the display-opening 3 in order to register the number of cash fares received. The units-disk 35 will first be moved to register the fares received up to nine and will then turn the second disk to bring its numeral "1" in alinement with the "0" on the units-disk and register the tenth fare, and thereafter by suitable transfer mechanism the third disk of the series will be operated, so that any number of fares up to nine hundred and ninety-nine may be registered.

To the shaft 32 is secured a ten-toothed ratchet-wheel 38, with which may engage a tooth 39 on or forming part of a slide 40, that has suitable longitudinal slots 41 for the reception of guiding pins or screws 42. The end of the slide is turned into the path of movement of the operating-lever 17, and the lever at this point is provided with bearings carrying a small antifriction-roller adapted for engagement with the slide in order to reduce friction and render the operation thus difficult. Each time the lever is moved in the direction of the slide its tooth will engage one of the teeth of the ratchet-wheel 38 and will move the same to the extent of one-tenth of a revolution, and this movement will be imparted to the units-disk 32 and register one fare. With the ratchet-teeth engages a spring-pressed pawl 43 in order to hold the ratchet-wheel in the position to which it is moved, and after the release of the operating-lever 17 a spring 44 serves to restore the slide to its initial position. It will be seen that on the operating movement of the slide 40 in the direction of the arrow the tooth 39 will engage one of the teeth of the ratchet-wheel 38 and will move the same for a distance sufficient to permit the spring 43 to pass beyond the crown of the next tooth, and thus complete the movement of the ratchet-wheel. On reverse movement the tooth 39 will momentarily engage the tooth succeeding that previously operated upon, but not to an extent sufficient to cause the spring 43 to pass over the crown of another tooth. In other words, the tooth 39 is in engagement with a tooth of the ratchet-wheel during nearly all of the movement in the direction of the arrow; but on reverse movement there is considerable lost motion of the tooth 39 before it engages the wheel. On the shaft 32 is arranged a disk 46, having a single tooth 47, which at the completion of each revolution engages between two teeth of a series of twenty on a toothed wheel 48, that is secured to the shaft 33, the construction of these being of much the same character as the device known as the "Geneva stop" and the wheels interlocking, so that it is impossible to obtain more than a tenth revolution of the tens-disk from a single revolution of the units-disk. In like manner the shaft 33 carries a disk 50, having a single tooth 51 for engagement with a toothed wheel 52 on the shaft 34, so that throughout the series of disks the transfer mechanism is such as to be positive in its action and prevent movement of greater or less distance than is necessary to effect proper registration of the fares collected.

Before starting a new trip it is desirable that all of the registering mechanism be restored to zero position, and for this purpose a suitable mechanism is employed that may be operated by a rod 53, having a suitable knob 54 at the exterior of the casing. On the shafts 32, 33, and 34 are arranged mutilated bevel-gears 55, 56, and 57, respectively. The teeth of the bevel-gear 56 intermesh with the teeth of the pinion 58, carried by a shaft 59, by suitable bearings formed in brackets carried by the frame and provided at one end with a gear-wheel 60. When this gear is turned, the movement is imparted through the bevel-gears to a mutilated gear 56 and the latter is turned until the pinion passes into the plane portion of the gear, at which time the secondary disk will be restored to zero position. The inner end of the rod or shaft 53 is adapted to a suitable bearing in a bracket 61, and said shaft carries two pinions 62 and 63, adapted, respectively, to intermesh with the mutilated bevel-gears 55 and 57. Normally the rod or shaft 53 is thrown outward to move the pinions out of mesh with the gears by means of a spring 64, encircling the shaft, and when the device is to be operated by the conductor or other person the knob is pushed in until the gears are in engagement. The shaft 53 further carries a gear 65. When the shaft 53 is pushed in, the several gears all intermesh and rotative movement is simultaneously imparted to all of the three disk-carrying shafts, so that all may be restored to zero position.

The mechanism for recording the number of tickets received is precisely the same as that employed for registering the cash fares, and detailed description of this portion of the mechanism is therefore not considered necessary.

To provide for the registration of the total amount of fares received, whether in the form of cash, tickets, transfers, or the like, it becomes necessary to register each movement of the operating-lever when moved either for the registration of a cash fare or the receipt of a ticket. The totals-registering mechanism comprises a plurality of disks, including a units-disk 70, a tens-disk 71, a hundreds-disk 72, a thousandths-disk 73, and a ten-thousandths disk 74, all of which are connected by transfer mechanism of the Geneva stop character described in detail in the construction of the mechanism for registering the receipt of a cash fare. The units-disk 70 is mounted on a stud 80, that is supported by a suitable bracket 81, carried by the plate 13. The disk is secured to a collar 82, surrounding the stud, and this collar carries a locking-wheel 84 and a ratchet-wheel 85. The locking-wheel is provided with ten teeth corresponding in number to the numerals in the units-disk, and the wheel is locked in position immediately after each angular movement of the ratchet-wheel by means of a spring-pressed rod 86, carrying a suitable antifriction-roller 87 for engagement in the spaces between the teeth of the ratchet-wheel.

On the rear face of the plate 13 are two boxes 90 and 91, having bearings for the reception of a longitudinally-movable rod 92, that carries at one end a pawl 93 for engagement with the teeth of the ratchet-wheel 85.

This rod is normally retracted by a helical compression-spring 94, fitted in a guiding-opening of the box 90, the tension of the spring being adjusted by suitable nuts 95 on the threaded end of the rod 92. On the rod 92 is secured a block 98, that is rectangular in form and serves by the engagement of one of its faces against the rear face of the plate 13 to prevent rotative movement of the rod. The lower end of the block 98 is disposed in the path of movement of the upper end of the operating-lever 17, and each time this lever is moved for the registration of the receipt of a ticket the block and rod 92 are moved in the direction of the ratchet-wheel 85, and the latter is turned to the extent of a single tooth, this movement being imparted to the units-registering disk 70. In this connection it will be observed that the relation of the teeth of the ratchet-wheel and the locking-wheel to the pawl and locking-rod is such that when the pawl has completed its forward movement the antifriction-roller of the locking-rod will be varied at one edge of one of the teeth of the locking-wheel, and the actuating-spring of the locking-rod will then force the roller down into the space between two teeth and complete the movement, the ratchet-wheel being thus moved forward for a slight distance beyond the distance to which it is moved by the pawl.

To the rear of the plate 13 are secured pins 100, forming guides for a longitudinally-slotted bar 101, that bears at one end against the block 98. The plate is also provided with a pivot-stud 102, carrying a lever 103, having a forked end that engages a pin or antifriction-roller 104, carried by the slide 101. The lever 103 is provided with a notch or recess 105 for the reception of a pin 106, carried by the lever 17, and when the operating-lever is moved for the purpose of registering the receipt of a cash fare the pin enters this notch or recess and through the lever and the slide 101 transmits movement to the block 98 and operates the rod 92 and the pawl in the manner previously described, the movement being transmitted to the units-wheel of the registering mechanism. In this manner every movement of the operating-lever in both directions is recorded on the totals-indicating disk and displayed at the openings in the front of the casing.

At the rear of the plate 13 is arranged a bell or similar alarm 107, with which may engage a clapper mounted on a pivoted clapper-rod 108, that is connected by a link 109 to a rocker-arm 110 on a hollow rock-shaft 111. The rock-shaft is mounted on a stud 112 and is provided with a second arm 113, which is engaged by a spring 114, carried by the base-plate 13. The arm 113 is directly above the locking-rod 86, and each time the latter is raised by partial rotative movement of the locking-wheel the clapper-rod will be raised from the bell, and when the locking-rod again descends to its normal position under the influence of the spring 114 the clapper will fall against the bell and sound the alarm. This occurs at each operative movement of the register whether actuated for the registration of a cash fare or the receipt of a ticket, or bells of different sound may be employed and operated independently in order to give an audible signal of the character of fare received.

On the units-registering disk of the totals-registering mechanism is secured a pin 120, which engages a contact 121 at each revolution of the disk and forces said contact into engagement with a second contact 122; but this will only partly close the circuit for operating the alarm or alarms, the circuit being further broken by a pair of contacts 123 and 124, disposed adjacent to the tens-disk of the totals-registering mechanism. The tens-disk carries a pin 125, preferably insulated from the disk and adapted to engage said contacts once during each complete revolution. When so engaged, the circuit will be closed between contacts 123 and 124, but at this time may be opened between 121 and 122 until the units-disk moves a sufficient angular distance to engage contacts 121 and 122 this circuit will be broken. When both contacts are in engagement, a circuit will be established from a battery or other source of electrical energy, a conventional battery 126 being shown in the present instance. The circuit may be traced from one pole of the battery, through a wire 127, to an electromagnetic bell 128 and from thence by wire 129 to contact 124, contact 123, wire 130, contact 122, contact 121, and wire 131 to the opposite pole of the battery. A circuit is also established by way of wire 127 and wire 132 to the pea-lamp 133 and from thence by wire 134 to wire 129, contacts 124 123, wire 130, contacts 122 121, wire 131, back to battery, thus energizing both the bell and the lamp and giving both an audible and a visual signal which will instantly attract the attention of the passengers, and at this time the conductor gives to the person whose fare he has last registered the prize or award previously determined upon. It will be observed that the tens-disk is provided with a plurality of openings, into any one of which the pin 125 may be inserted, so that at the car-barn the position of the pin may be adjusted in order to prevent the manipulation of the device by the conductor for his own benefit.

In devices of this class it is desirable that a registration be kept of the number of times a prize is awarded in order that the auditor may check the conductor's returns, and for this purpose the transferring-disk of the tens-disk engages an auxiliary toothed wheel 136, mounted on a stud 137 on the plate 13. Secured to and moving with the toothed wheel 136 is a toothed wheel 138, that engages a toothed wheel 139 on a stud 140, carried by the base-plate. To the wheel 139 is secured a registering-disk 141, bearing any desired number of numerals, which are displayed consecutively at the display-opening formed for the purpose in the face-plate of the apparatus, and the relative arrangement of the gearing is such that each time a circuit is closed to energize the alarm or alarms a rotary movement will be imparted to the disk 141 and a new numeral will be moved opposite the display-opening, so that it will accurately register the number of prizes given out by the conductor.

Inasmuch as the principal object of the invention is to keep the attention of the passengers attracted to the fare-register, and thus lessen the liability of false registration on the part of the conductor, it becomes desirable to provide means whereby the same advantages may be attained in connection with cash-registers already in use without the necessity of employing a specially-constructed register. For this purpose I have devised a novel form of attachment embodying the invention and which may be described as a "spotter" attachment for fare-registers. The mechanism is mounted within a suitable casing 143, the base of which is preferably concaved in order that it may be firmly secured to the top of an ordinary fare-register, such as that indicated at 144, and these registers being usually circular in form. The front of the casing is provided with an opening of the character previously described for the display of a light, a pea-lamp being disposed within the casing to the rear of the opening and illuminating the latter when the energizing-circuit is closed. The front of the casing is further provided with a display-opening 145, through which may be displayed numerals on an indicating or registering disk, which is turned each time the alarm-circuit is closed. Within the casing is a base-plate 148, both sides of which are used as supports for the operating mechanism, and this mechanism receives motion through a rod 149, that is connected by a suitable lever 150 to the pull-rod 18 of the cash-fare-registering device, it being designed in this instance that the prize-awarding device be operated only when cash fares are received, although, of course, it may be connected in any suitable manner to the operating-lever in order to permit the transmission of the operative movement to the prize-awarding device each time the main register is operated for recording a cash fare or the receipt of a ticket. To the front of the base-plate is secured a bracket 152, and to the rear is secured a similar bracket 153, these serving as supports for a horizontally-disposed shaft 154, which extends through an opening formed in the base-plate. That portion of the shaft 154 at the rear of the plate carries a ratchet-wheel 155 and a toothed locking-wheel 156. The ratchet-wheel is engaged by a pawl 157, carried at one end of a guided bar 158, mounted in a suitable opening in a guiding-block 159, and normally retracted by a suitable spring 160. The rear of the rod 158 is provided with an antifriction-roller 161, that bears against one end of a lever 162, fulcrumed to a stud 163 on the rear of the base-plate. The lower end of the lever 162 is connected to the rod 149, previously described, and said lever is normally held in an inoperative position by a spring 164, extending between the lever and the fixed pin on the base-plate. The limit of the movement of the lever is fixed by a pair of pins 165, extending from the plate. The locking-wheel 156 is engaged by an antifriction-roller carried by a spring-pressed rod 166, and the roller enters the space between two of the teeth of the locking-wheel at the completion of each partial rotative movement of the ratchet-wheel, so that the two wheels are automatically centered and held in proper position after each operative movement of the pawl. To the rear of the base-plate is secured a block 167, formed of insulating material and carrying a contact-spring 168, disposed within the path of movement of the lever 162 and forming one terminal of an electric circuit, to be hereinafter more fully described.

To the front end of the shaft 154 is secured a disk 170, having a single tooth 171 for engagement with a toothed wheel 172, mounted on a stud 172', carried by the front portion of the base-plate. The disk 171 and toothed wheel 172 form, in effect, a Geneva stop-movement, the parts being interlocked during intervals between their intermeshing. The disk 170 carries an insulating-pin 174, which may be adjusted to any one of a number of openings 175 formed in the disk, and at the completion of each rotative movement of said disk this pin comes into engagement with a contact-spring 176 and moves the latter against a similar contact-spring 177, the engagement of these two contacts partially closing an energized circuit in which the alarm mechanism is connected.

The toothed wheel 172 is provided with an insulated pin 177', which may be adjustably mounted in one of a number of openings 178, carried by the wheel, and at the end of each complete rotative movement of the wheel 172 this pin comes into engagement with a contact-spring 179, mounted on an insulated block 180, carried by the front of the base-plate. The contact-spring 179 is moved into engagement with a contact-spring 181, and when so engaged these partly complete the energized circuit in which the lamp is disposed. Secured to and moving with the toothed wheel 172 is a disk 182, that intermeshes with a toothed wheel 183, mounted on a stud 184, extending from the front of the base-plate, and to this latter wheel is secured a second toothed wheel, 185, which intermeshes with a toothed wheel 186, mounted on a stud 187, the toothed wheel 186 further carrying a disk 188, bearing an annular row of numerals or like indicating devices which are moved successively into alinement with the opening 145 in the front plate of the apparatus in order to record the number of times the alarm-circuit has been closed. The toothed wheel 185 is at all times in engagement with a contact-spring 190, carried by an insulating-block 191 on the front of the baseplate and forming another terminal of the alarm-circuit.

Each time the lever 162 is operated it will engage the contact 168, and each time the disk 170 is revolved pin 174 will engage contact 176; but neither of these will be effective until the pin 177' engages the contact 179. When all of the contacts are engaged, circuits may be traced as follows: from one terminal of battery 200 through binding-post 201, wire 202, to bell 203, thence by wire 204 to contact 168, lever 162, frame of the machine, thence to gear 185, contact 190, wire 205, to contact 181, contact 179, wire 206, contact 177, contact 176, wire 207, binding-post 208 and return to battery, thence energizing the bell. The light circuit may be traced from battery 200, binding-post 201, wire 209, lamp 210, wire 211, wire 204, contact 168, lever 162, the frame of the machine, contact 190, wire 205, contact 181, contact 179, wire 206, contact 177, contact 176, wire 207, binding-post 208 and return to battery. At this time both the bell and the visual alarm in the form of the lamp 210 will be energized, and the attention of the passengers will be instantly called thereto. By adjusting the positions of the current-closing pins 174 and 177 the time in which the circuit is closed may be altered at the car-barn, so that the conductor cannot take advantage of the apparatus.

It will be observed that by the employment of a plurality of contacts which must be closed at different points and by circuit-closers traveling at different speeds it is possible to secure several adjustments of the device with a view of protecting the owners in the event of persons becoming familiar with the construction and operation of the apparatus. This feature of the invention may be further developed by so arranging the circuit-closers as to provide for the closing of the circuit by an indeterminate number of operations of the register, so that the closing of the circuit will be wholly a matter of chance, and while this to some extent would be objectionable on street-railways, where the company might desire to pay out only a certain proportion of the fares collected, it could be profitably employed in many cases where the mechanism is used for other purposes.

Figure 14:
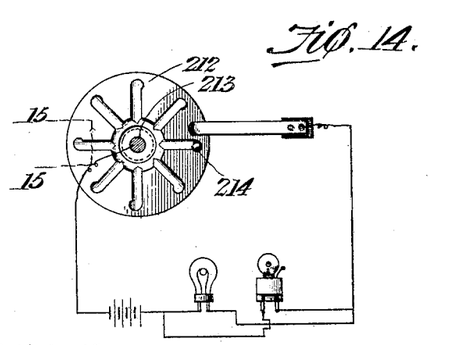
Fig. 14 is an elevation, partly in the nature of a diagram, illustrating a modification of the invention in which the circuit-closer is so arranged as to close the circuit at indeterminate periods.
Figure 15:
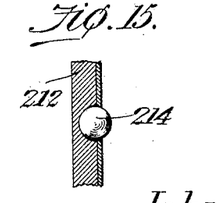
Fig. 15 is a sectional view of a portion of the same on the line 15 15 of Fig. 14, the view being drawn to an enlarged scale.
Figure 16:
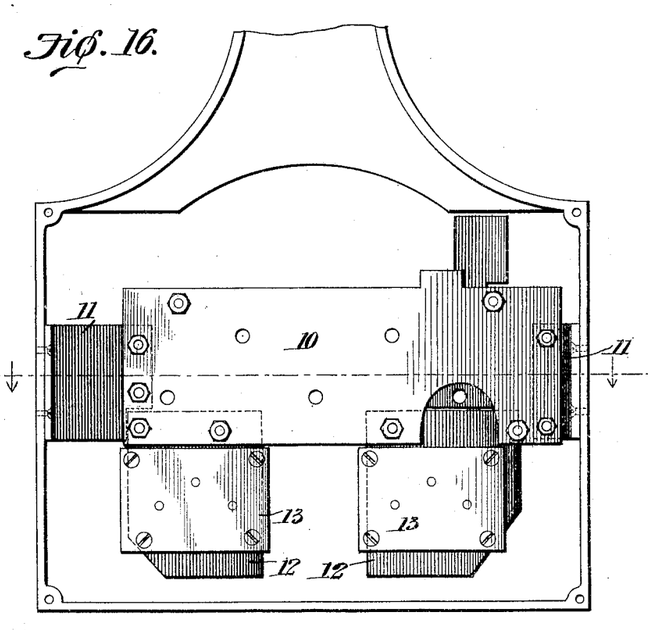
Fig. 16 is a detail elevation of the frame attached to the casing.
Figure 17:
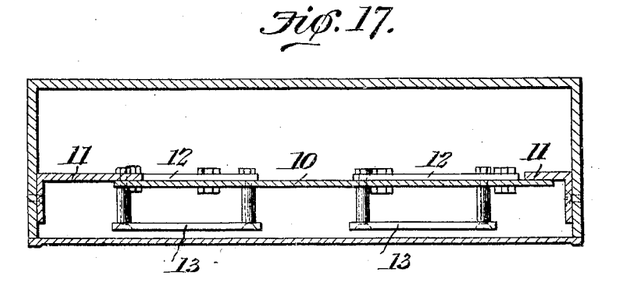
Fig. 17 is a sectional plan view of the frame on the line 17 17 of Fig. 16.

In Figs. 14 and 15 is illustrated a circuit-closing device in which the time of closing the circuit is a matter of chance. In this case a disk 212 is mounted on a stud 213, on which the disk may be revolved by the register or other mechanism. This disk is provided with a plurality of undercut slots, shown in the present instance as extending from radial lines and all connected to an annular groove immediately around the periphery of the hub portion of the disk. The disk carries a ball or roller 214, which may roll freely into any one of the slots and pass from one or other by means of the annular groove. At the outer end of each of the slots is a small pocket in which the circuit-closer is received and in which it is retained while the disk moves past contacts which are to be engaged to close the circuit. After moving for a short distance beyond the contacts the ball is free to roll by gravity down toward the annular groove at the central portion of the disk and thence to pass to any one or other of the radiating slots to be held in the pocket formed in the end of the slot in readiness for the next circuit-closing movement. The number of slots and their positions may be increased to any desired extent, and it will be seen that the location of the ball is at all times purely a matter of chance, so that the circuit may be closed for a time at regular intervals and at other times at irregular intervals.

Having thus described the invention, what is claimed is—

1. The combination with a register including gears operable at different speeds, of an actuating means, circuit-closing devices carried by the gears, an alarm, an electric circuit including a plurality of spaced contacts normally breaking the circuit at a plurality of points, said contacts being engaged by the circuit-closers, and a mechanically-actuated indicator for registering the number of operations of the alarm.

2. The combination with registering mechanism, including a plurality of gears revoluble at different speeds, of an alarm, a circuit connecting the alarm to a source of electrical energy and including a plurality of normally spaced contacts, pins or lugs carried by the gears and serving to move the contacts into engagement to close the circuit, one of said pins or lugs being adjustable.

3. The combination with a register, including gear-wheels revoluble at different speeds, of a register-actuating means, an alarm, a circuit connecting the alarm to a source of electrical energy and including normally spaced contacts arranged in two or more sets, and independent circuit-closers carried by the gears of the register, the circuit-closer carried by the gear making the smallest number of revolutions remaining in circuit-closing position for a length of time sufficient to permit the circuit-closer carried by the gear making the highest number of revolutions to accomplish the final making and breaking of the circuit.

4. In mechanism of the class described, an alarm or signal, a circuit connecting the same to a source of electrical energy, said circuit including a plurality of spaced contacts, means for successively closing said contacts to establish a circuit, and means movable at each final closing of the circuit for indicating or registering the number of times the circuit has closed.

5. In mechanism of the class described, an alarm or signal, a circuit connecting the same to a source of electrical energy and including a plurality of independent normally spaced contacts, a plurality of circuit-closers arranged to successively move said contacts into engagement with each other to establish a circuit, and means movable at each final closing of the circuit for indicating or registering the number of times the circuit has closed.

6. In mechanism of the class described, an alarm or signal, a circuit connecting the same to a source of electrical energy, said circuit including a plurality of spaced contacts, means for successively closing said contacts to establish the circuit, and means movable at each final closing of the circuit for indicating or registering the number of times the circuit has been closed.

7. In mechanism of the class described, an alarm or signal, a circuit connecting the same to a source of electrical energy, said circuit including a plurality of normally spaced contacts, independent circuit-closing devices movable successively to circuit-closing position, and a mechanical means movable at each final closing of the circuit for indicating or registering the number of times the circuit is closed.

8. In a register, an alarm or signal, a circuit connecting the same to a source of electrical energy, said circuit including normally spaced contacts, a train of gears leading from one of the registering-disks, a registering-disk connected to the train of gears and serving to register the number of circuit-closing operations, and a circuit-closer carried by one of the train of gears for engaging and moving the contacts to circuit-closing position.

9. In registering mechanism, an indicating or registering disk, a ratchet-wheel and a locking-wheel movable therewith, the spaces between the teeth of the locking-wheel having inclined walls, an operating-lever, a pawl movable by the lever to engage the teeth of the ratchet-wheel, and a spring-pressed plunger or bar having an antifriction-roller engaging the periphery of the locking-wheel and serving by contact with said inclined walls to advance both the wheels and the disk slightly beyond the positions to which the ratchet-wheel is moved by the pawl.

10. In registering mechanism, a registering-disk, a ratchet-wheel movable therewith, a pawl for engaging the ratchet-wheel, a slide carrying the pawl, a spring normally tending to maintain the slide and pawl in an initial position, a block or lug projecting from the slide, an operating-lever adapted to engage said block or lug to effect operative movement of the pawl, and a means movable by the lever in the opposite direction for indirectly communicating movement to said block or lug, substantially as specified.

11. In registering mechanism, a registering-disk, a ratchet-wheel movable therewith, a pawl for engaging the ratchet-wheel and pawl-carrying bar, a block or lug secured thereto, a pivoted operating-lever adapted to engage said block or lug when moved in one direction, a slide in contact with said locking-lug, and an intermediate lever between the operating-lever and slide for the transmitting movement to the block or lug when the operating-lever is moved in the opposite direction.

12. In a registering mechanism, a registering-disk, a ratchet-wheel movable therewith, a pawl for engaging the ratchet-wheel, a pawl-carrying bar, a block or lug secured to the bar and having a flattened face for engaging a fixed portion of the register to prevent rotative movement of the pawl-carrying bar, an operating-lever serving when moved in one direction to directly engage said bar, a guided slide normally in contact with the block, and a lever pivoted to the frame and engaging at one end with the slide and at the opposite end with the lever to thereby transmit operative movement from the main lever to the block when said main lever is moved in the opposite direction.

13. In a registering mechanism, a plurality of registering-disks, means for moving the primary disk, transfer mechanism between the disks, shafts carrying said disks, a mutilated bevel-gear for each shaft, bevel-pinions for engaging the gears but normally out of mesh therewith, and a longitudinally-movable shaft carrying said pinions and adjustable to place the latter in mesh with the gears.

14. In a registering mechanism, a plurality of registering-disks, means for moving the primary disk, transfer mechanism between the several disks, shafts carrying the disks, mutilated gears arranged, one on each of the shafts, a revoluble shaft, a bevel-pinion at one end for engaging the mutilated gear of the intermediate disk, a toothed wheel at the opposite end of the shaft, a longitudinally-adjustable shaft having a milled or knurled turning-knob, a pair of pinions, carried by the shaft and adapted to engage the mutilated gears of the end disks, and a toothed wheel carried by the longitudinally-movable shaft and adapted to engage the first-named toothed wheel thereby to permit independent restoring movement of each of the disks.

In testimony that I claim the foregoing as my own I have hereto affixed my signature in the presence of two witnesses.

JOHN ODEN MORRIS.

Witnesses:
J. H. JOCHUM, Jr.,
JOHN A. TRAYLOR.